(12) United States Patent
Fatora et al.

(10) Patent No.: US 8,336,888 B2
(45) Date of Patent: Dec. 25, 2012

(54) GASKET WITH ENGINE LINER ACCOMODATION

(75) Inventors: Paul Fatora, Woodridge, IL (US); Rohit Ramkumar, Romeoville, IL (US); Frank Popielas, Plainfield, IL (US); David Schweiger, Pewaukee, WI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 528 days.

(21) Appl. No.: 12/589,330

(22) Filed: Oct. 22, 2009

(65) Prior Publication Data
US 2011/0095489 A1    Apr. 28, 2011

(51) Int. Cl.
*F02F 11/00* (2006.01)
(52) U.S. Cl. .......... 277/592; 277/594; 277/595
(58) Field of Classification Search .......... 277/592–596
See application file for complete search history.

(56) References Cited

U.S. PATENT DOCUMENTS

| | | | | |
|---|---|---|---|---|
| 4,112,907 A * | 9/1978 | Nikly | ................ | 123/193.3 |
| 4,714,260 A * | 12/1987 | Udagawa | .............. | 277/595 |
| 4,739,999 A * | 4/1988 | Ishii et al. | .............. | 277/595 |
| 4,809,653 A * | 3/1989 | Udagawa et al. | ........... | 123/193.3 |
| 5,039,117 A * | 8/1991 | Gohrlich et al. | ............. | 277/591 |
| 5,286,039 A * | 2/1994 | Kawaguchi et al. | .......... | 277/593 |
| 5,669,615 A * | 9/1997 | Hohe et al. | ............. | 277/595 |
| 5,863,046 A * | 1/1999 | Diez et al. | ............. | 277/593 |
| 6,315,303 B1 * | 11/2001 | Erb et al. | .............. | 277/593 |
| 6,328,314 B1 * | 12/2001 | Jinno et al. | ............. | 277/593 |
| 6,450,504 B2 * | 9/2002 | Bleidt et al. | ............. | 277/592 |
| 6,705,618 B2 * | 3/2004 | Jinno et al. | ............. | 277/593 |
| 6,719,301 B2 * | 4/2004 | Chen et al. | ............. | 277/601 |
| 6,827,352 B2 * | 12/2004 | Ueta et al. | ............. | 277/593 |
| 6,931,705 B2 * | 8/2005 | Kueltzo et al. | ........... | 29/402.02 |
| 6,951,338 B2 * | 10/2005 | Kestly | ............. | 277/593 |
| 7,815,197 B2 * | 10/2010 | Ueta | ............. | 277/593 |
| 8,042,815 B2 * | 10/2011 | Okuno et al. | .............. | 277/593 |
| 2002/0011709 A1 * | 1/2002 | Jinno et al. | ............. | 277/593 |
| 2004/0160017 A1 * | 8/2004 | Diez et al. | ............. | 277/593 |
| 2004/0183260 A1 * | 9/2004 | Kestly | ............. | 277/593 |
| 2006/0097459 A1 * | 5/2006 | Hohe et al. | ............. | 277/593 |
| 2007/0069482 A1 * | 3/2007 | Yasuda | ............. | 277/593 |
| 2007/0200301 A1 * | 8/2007 | Novil et al. | ............. | 277/596 |
| 2008/0203676 A1 * | 8/2008 | Yasuda | ............. | 277/595 |
| 2009/0166985 A1 * | 7/2009 | Hohe et al. | ............. | 277/592 |
| 2009/0200752 A1 * | 8/2009 | Okano | ............. | 277/592 |
| 2009/0267308 A1 * | 10/2009 | Schmucker | ............. | 277/592 |
| 2010/0164185 A1 * | 7/2010 | Unseld et al. | ............. | 277/596 |
| 2010/0327540 A1 * | 12/2010 | Okano et al. | ............. | 277/592 |
| 2011/0095488 A1 * | 4/2011 | Plunkett | ............. | 277/592 |

* cited by examiner

*Primary Examiner* — Vishal Patel

(74) *Attorney, Agent, or Firm* — Marshall & Melhorn, LLC

(57) ABSTRACT

A gasket has a first active layer with a bead. A first spacer layer is located below the first active layer. An intermediate layer is provided with a wave portion. The intermediate layer is located below the first spacer layer. A bottom spacer layer is located beneath the intermediate layer. The bottom spacer may have a bead.

17 Claims, 4 Drawing Sheets

GASKET WITH ENGINE LINER ACCOMODATION

FIELD OF THE INVENTION

The present invention relates to a gasket, such as a gasket for an internal combustion engine. More particularly, the gasket may have an accommodation for a feature on the engine liner.

BACKGROUND OF THE INVENTION

Gaskets are well-known structures frequently utilized to create seals between two or more structures. Gaskets are frequently employed in internal combustion engines to provide liquid and gas seals between the various components of the engine.

In one application, at least one gasket may be located between a cylinder head and a cylinder block to provide a seal between these components. Some engines utilize a liner incorporated within the engine block. The liner may have a raised feature which can be triangular or trapezoidal in cross-section. The liner may extend entirely about the combustion opening.

Gaskets have been developed to accommodate the raised feature with limited success. It has been found that these gaskets do not provide a robust combustion seal and typically they crack at the raised liner feature. The limitations of these gaskets may be attributed to the fact that they concentrate the initial loading at the raised liner feature. Unfortunately, however, this design leads to the above problems and it may also result in mechanical damage to the gasket and/or the raised feature on the liner. Therefore, it would be preferable to have a gasket that accommodated the raised liner feature, effectively seal and minimize or eliminate the potential for damage to the gasket and/or the raised feature.

SUMMARY OF THE INVENTION

The present invention is directed toward a gasket with a first active layer, a first spacer layer, an intermediate layer and a second spacer layer. The first active layer has a bead located above an engine liner. The first spacer layer is located below the first active layer. The intermediate layer has a wave portion and a planar portion. The intermediate layer is located below the first spacer layer. The second spacer layer is located between the intermediate layer and the engine liner. The second spacer layer may have a bead for accommodating a raised feature in the engine liner.

BRIEF DESCRIPTION OF THE DRAWINGS

The above, as well as other advantages of the present invention, will become readily apparent to those skilled in the art from the following detailed description when considered in the light of the accompanying drawings in which:

FIG. 5 is a partial, cutaway side view of another embodiment.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
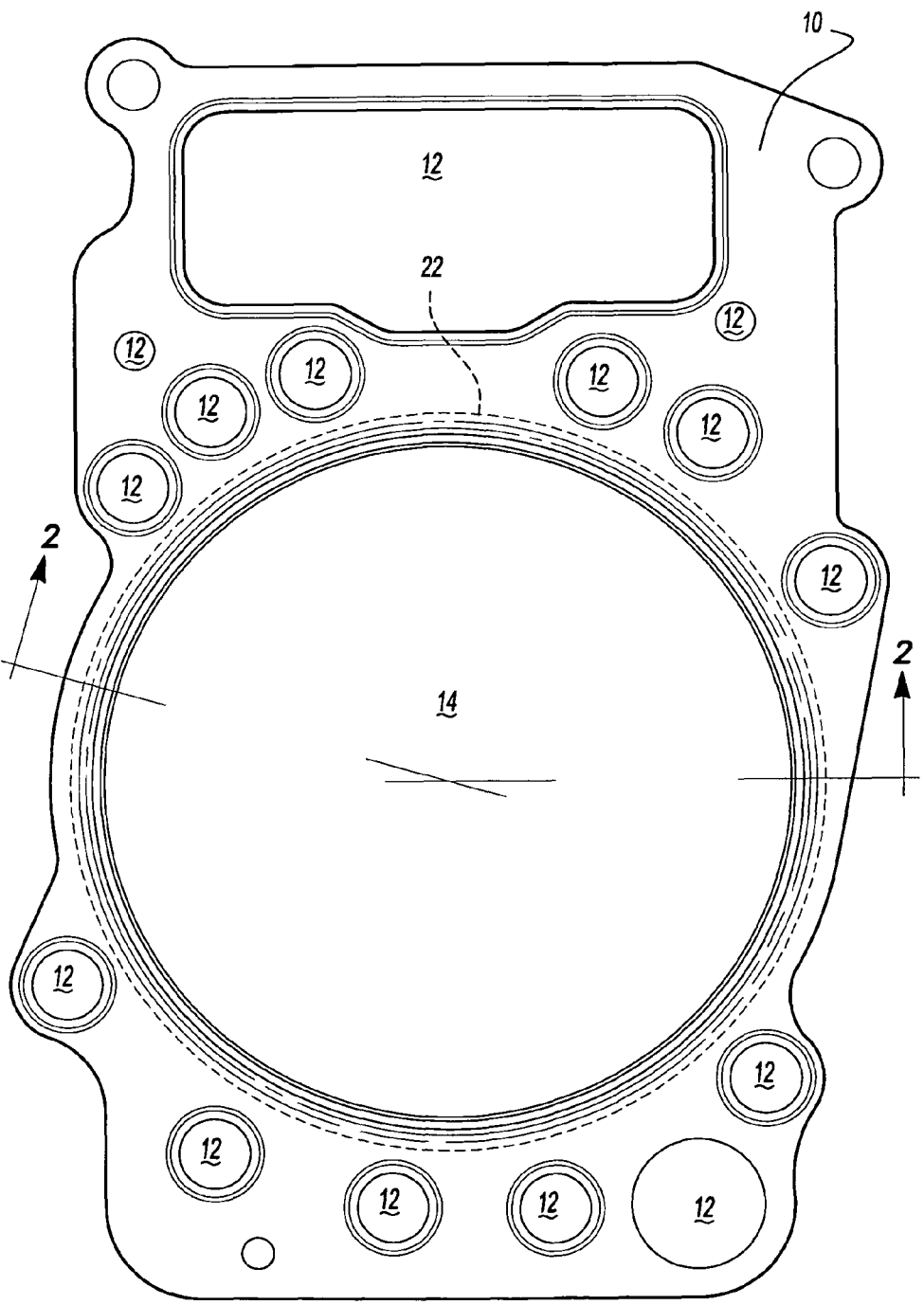
FIG. 1 is a schematic plan view of one embodiment of a gasket.

Turning now to FIG. 1, a preferred embodiment of the present invention is depicted. FIG. 1 shows a top view of a gasket 10. The gasket preferably has a plurality of openings 12 located through the gasket. The openings 12 may be such as fastener openings, fluid openings and at least one combustion opening 14. The combustion opening 14 has a circular perimeter 16 defined by the gasket material.

Figure 2:
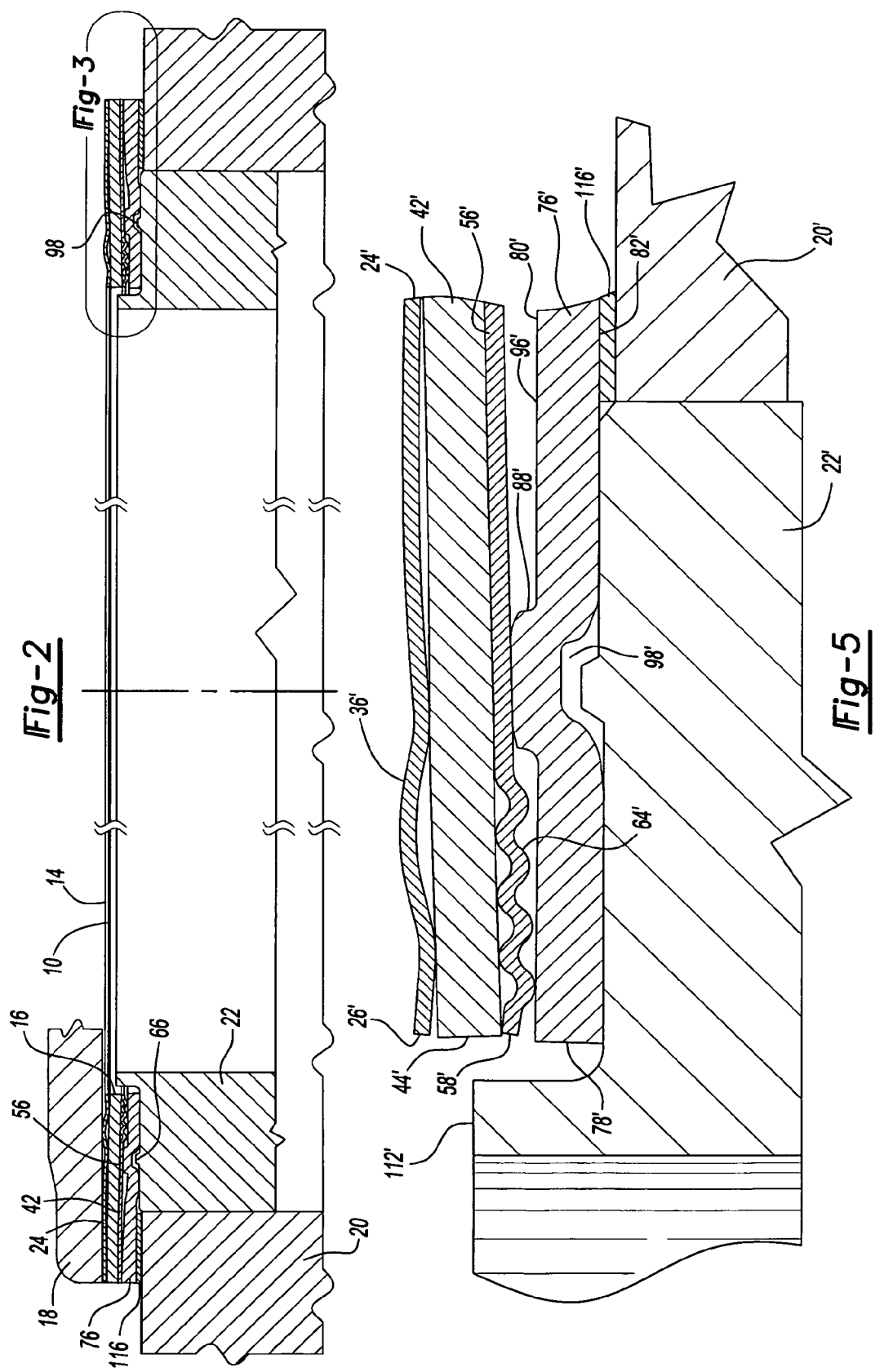
FIG. 2 is a view along line 2-2 of FIG. 1.
Figure 3:
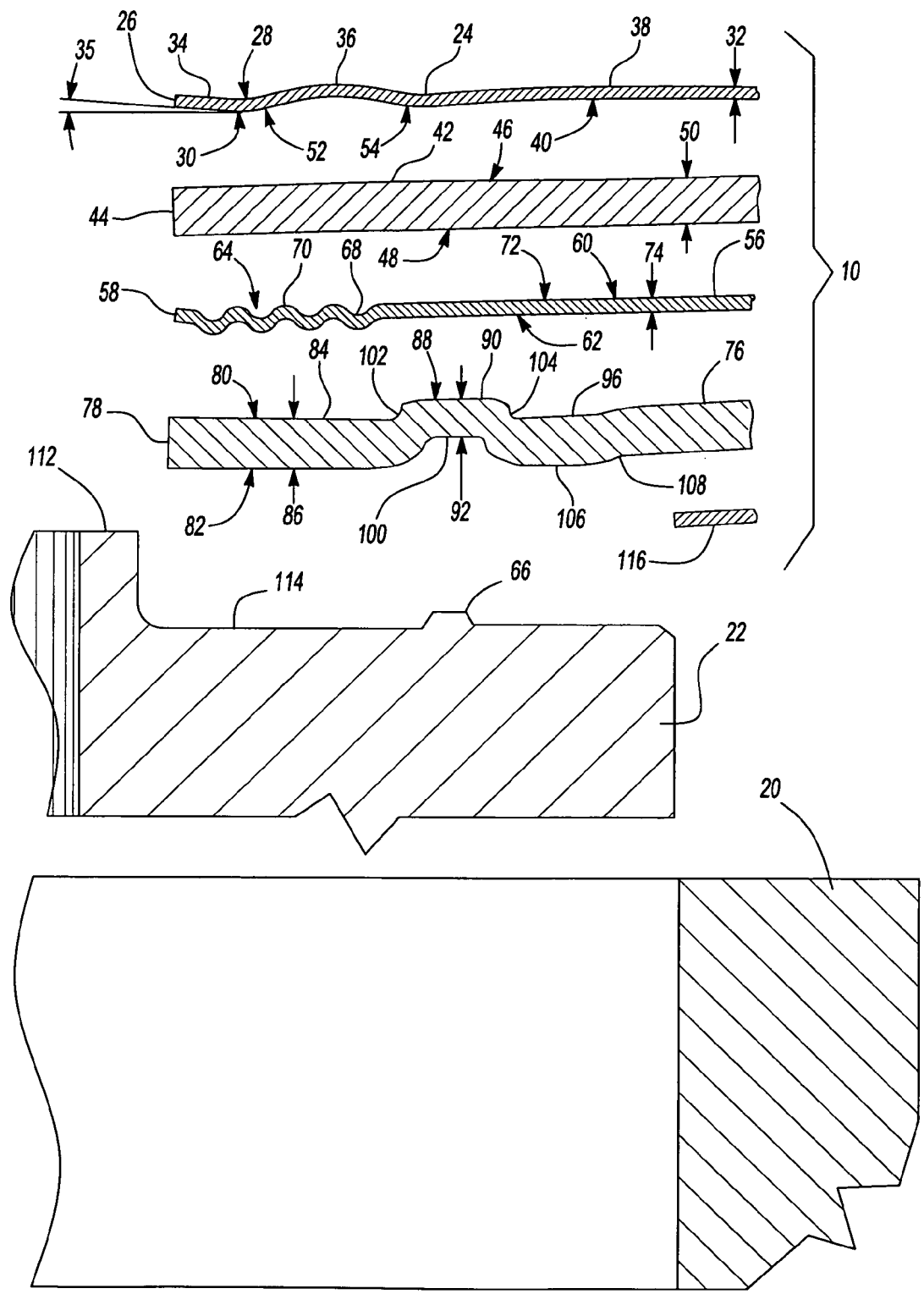
FIG. 3 is an exploded view of one area of FIG. 2.
Figure 4:
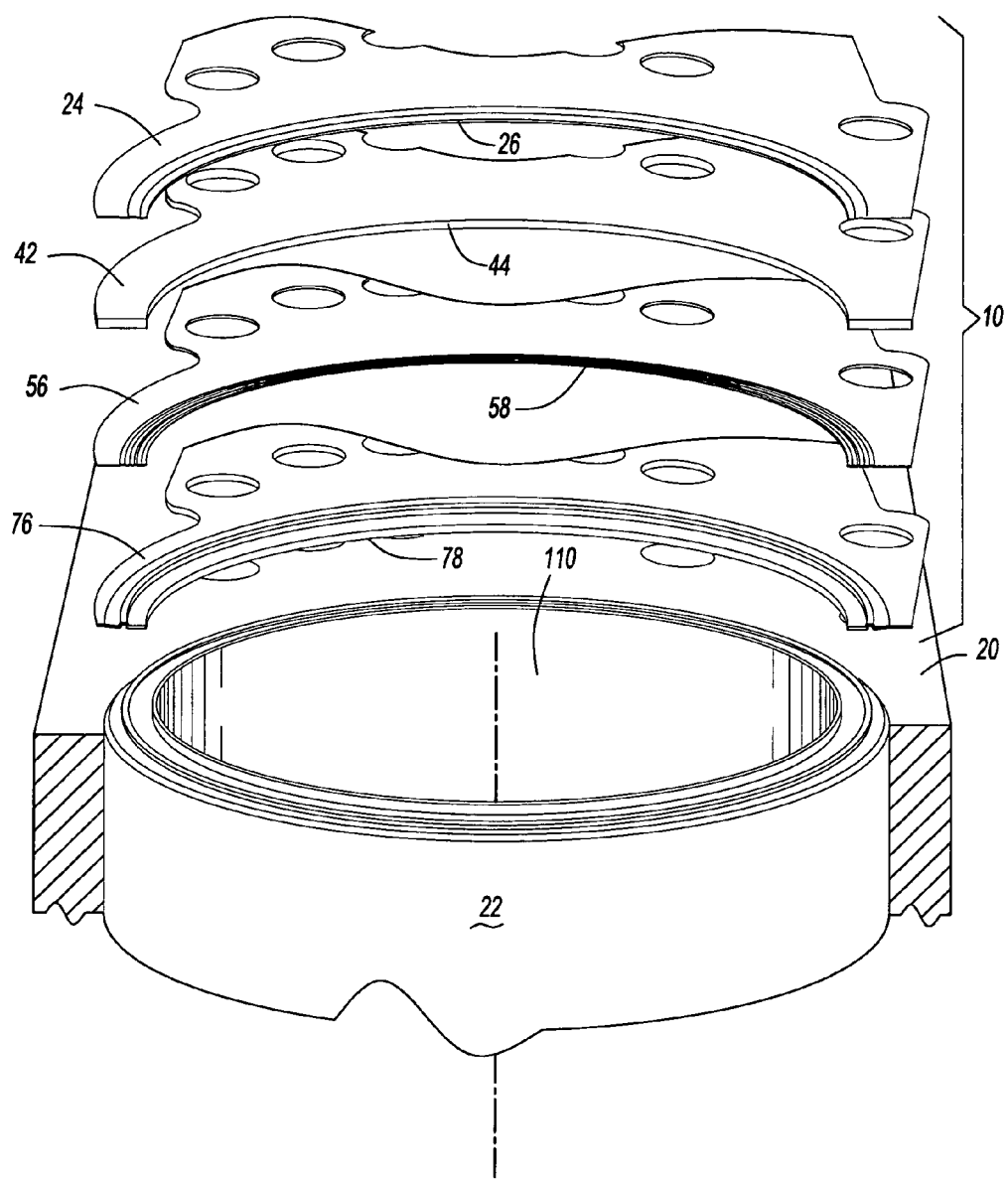
FIG. 4 is an exploded, perspective view of the present invention.

FIGS. 2-4 depict one embodiment of the gasket 10 located between a cylinder head 18 and a cylinder block 20. The cylinder block 20 may have a cylinder liner 22. While one embodiment of a cylinder head 18, block 20 and liner 22 are depicted in conjunction with the present invention, the present invention may be utilized equally effectively with other heads, blocks and liners.

Preferably, a first active layer 24 is provided. The first active layer 24 extends entirely about, and forms part of, the perimeter 16 of the combustion opening 14 in the gasket. More particularly, an inner edge 26 of the first active layer 24 forms part of the perimeter 16.

The first active layer 24 has an upper surface 28 and a lower surface 30. The two surfaces 28, 30 are substantially parallel to one another resulting in a substantially uniform thickness 32 of the first active layer 24, although the thickness may vary.

The upper and lower surfaces 28, 30 together define a first land portion 34. The land portion 34 is located radially outboard of the inner edge 26 of the first active layer 24. The land portion 34 may have a slight upward angle 35 from the horizontal, as shown in FIG. 3. Other angles are also permissible or it is within the scope of the present invention for the land portion 34 to have no angle with respect to the horizontal.

Outboard of the land portion 34 a full bead 36 is provided. The full bead 36 is integrally formed and unitary with the land portion 34. The full bead 36 is formed from the upper and lower surfaces 28, 30 of the first active layer 24.

The bead 36 may be horizontally aligned with, but vertically offset from, the engine liner 22. The vertical offset results from the first active layer 24 being above additional lower layers, which will be described in additional detail below.

The bead 36 extends upwardly and then back down in a smooth, continuous fashion. While one example of a bead is shown, other forms of beads are also permissible.

Outboard of the bead 36, a second land portion 38 is provided. The second land portion 38 is also formed from the upper and lower surfaces 28, 30 of the first active layer 24. The second land portion 38 is integrally formed with and unitary with the bead 36.

The second land portion 38 may be formed to have a slight upward bow 40 from horizontal in it. Alternatively, there may be no bow in the second land portion 38 and the second land portion 38 may be substantially planar.

A first spacer layer 42 is provided beneath the first active layer 24. The first spacer layer 42 preferably has an inner edge 44 that also forms the perimeter 16 of the combustion opening 14 of the gasket 10.

The first spacer layer 42 has an upper surface 46 and a lower surface 48. The two surfaces 46, 48 are substantially parallel to one another to create a substantially constant thickness 50 in the layer 42. The spacer layer 42 extends from the inner edge 44 to at least the engine block 20.

At least a portion of the first active layer 24 is in direct contact with the upper surface 46 of the first spacer layer 42. In one embodiment, where the first and second land portions 34, 38 are at some angle, at least an inner and an outer portion 52, 54 of the full bead 36 are in contact with the upper surface 28 of the first active layer 24.

An intermediate layer 56 is provided below the first spacer layer 42. The intermediate layer 56 comprises an inner edge 58 that defines the perimeter 16 of the combustion opening 14 in the gasket 10. The intermediate layer 56 has an upper surface 60 and a lower surface 62.

The upper and lower surfaces 60, 62 together define a wave portion 64 that extends from the inner edge 58 radially outward. Preferably, the wave portion 64 extends from the inner edge 58 radially outward at least to a raised feature 66 on the engine liner 22, described in more detail below.

The wave portion 64 comprises a plurality of continuously connected troughs 68 and crests 70. Preferably, the crests 70 contact selected portions of the first spacer layer 42 located above. The troughs 68 contact selected portions of a second spacer layer located below the intermediate layer 56, described in more detail below.

A land portion 72 is located outboard of the wave portion 64 and it is integrally formed with and unitary with the wave portion 64. The land portion 72 extends from the wave portion 64 outwardly beyond the raised feature 66 at least to the cylinder block 20.

The upper and lower surfaces 60, 62 of the intermediate layer 56 extend in a substantially parallel fashion to one another to define an intermediate layer 56 of substantially constant thickness 74, although the thickness may vary. Preferably, the intermediate layer 56 and the first active layer 24 are thinner than the first spacer layer 42. The troughs 68 of the wave portion 64 may extend below the lower surface 62 of the land portion 72 of the intermediate layer 56. The crests 70 of the wave portion 64 may be planar with the upper surface 60 of the land portion 72 of the intermediate layer 56.

A second spacer layer 76 is located below the intermediate layer 56. The second spacer layer 76 has an inner edge 78 that defines the combustion opening perimeter 16 of the gasket 10.

The inner edges 78, 58, 44, 26 of the second spacer layer 76, the intermediate layer 56, the first spacer layer 42 and the first active layer 24 are all substantially radially aligned with one another so as to form a substantially uniform perimeter 16 of the combustion opening 14 of the gasket 10.

The second spacer layer 76 has an upper surface 80 and a lower surface 82. At least one of the troughs 68 of the intermediate layer 56 is in contact with the upper surface 80 of the second spacer layer 76.

Outboard of the inner edge 78 of the second spacer layer 76 is a first land 84. The upper and lower surfaces 80, 82 are substantially parallel with one another for the first land 84 thus providing a substantially constant thickness 86. The lower surface 82 of the first land 84 is in direct contact with the engine liner 22.

In the depicted embodiment in FIG. 3, a bead 88 is integrally formed with and unitary with the second spacer layer 76 outboard of the first land 84. The bead 88 extends upwardly in the second spacer layer 76 and away from the raised feature 66 on the engine liner 22. The bead 88 may be of a trapezoidal-type cross-section but beads of other designs are also permissible.

The bead 88 has an upper surface 90 that is located above the upper surface 80 of the second spacer layer 76. The upper surface 90 of the bead 88 is in contact with the lower surface 62 of the intermediate layer 56. Preferably, the bead 88 is in contact with the lower surface 62 of the land portion 72 of the intermediate layer 56 outboard of the wave portion 64.

In the preferred embodiment, the thickness 92 of the bead 88 is thinner than the thickness 86 of the first land 84 and a second land 96 on the other side of the bead 88. This creates a gap 98 between a lower surface 100 of the bead 88 and the raised feature 66 in the liner 22.

It is also permissible for the bead 88 to have the same thickness as the second spacer layer 76. In this embodiment, a gap 98 may or may not be present between the bead 88 and the raised feature 66 on the liner 22.

Transitions 102, 104 are located on either side of the upper surface 90 of the bead 88. The transitions 102, 104 preferably extend downwardly toward the upper surface 90 of the second spacer layer 76. The transitions 102, 104 may comprise radiused curves.

The second land 96 is located radially outboard of the bead 88. Preferably, the second land 96 is integrally formed and unitary with the bead 88. The second land 96 has a portion 106 that contacts the engine liner 22. In the depicted embodiment, the second land 96 may have a crank 108. The crank 108 causes the second spacer layer 76 to extend upwardly at an angle from the portion of the layer 76 that contacts the engine liner 22. The angle at which the second land 96 extends from the engine liner 22 may vary from that depicted in the figure. Alternatively, the second land 96 may be substantially parallel with the engine liner 22.

The engine liner 22 defines a piston chamber 110. The liner 22 comprises an upstanding rim 112 that extends entirely and continuously about the chamber 110. Outboard of the rim 112, the liner 22 defines a planar portion 114 that surrounds the rim 112. Preferably, the second spacer layer 76 rests on the planar portion 114 of the liner 22 as described above. At least a portion of the first spacer layer 42 and all of the first active layer 24 may extend vertically above the rim 112 of the liner 22.

The raised feature 66 on the liner 22 is located radially outboard of the planar portion 114. The raised feature 66 may be such as a bead that is integrally formed with the liner 22. The raised feature 66 may have a trapezoidal cross-section, as shown in FIG. 3, however, other cross-sections are permissible.

An additional active layer 116 may be located between the second land 96 and the engine block 20. The crank 108 in the second spacer layer 76 facilitates the accommodation of the additional active layer 116 between the second land 96 and the engine block 20.

Another embodiment of the second spacer layer 76' is depicted in FIG. 5. The reference numbers used above are used for the same features in this embodiment except that a prime has been added. There, the bottom spacer layer 76' does not have a crank. Instead, the layer 76' has a second land 96' with upper and lower surfaces 80', 82' that are substantially parallel to the upper and lower surfaces of the layer 76' outboard of the bead 88'.

Preferably, all of the layers 24, 42, 56, 76, 116 described above are constructed of metal. In one embodiment, the first active layer 24 and the intermediate layer 56 are constructed of hardened steel. The first spacer layer 42 and the second spacer layer 76 maybe constructed of standard steel.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket, comprising:
a first active layer having a full bead, said full bead being horizontally aligned with, but vertically offset from, an engine liner, said first active layer having an upper surface and a lower surface;
a first spacer layer having an upper surface and a lower surface, said first and second surface being substantially parallel to one another from an outer edge of said first spacer layer to radially beyond said engine liner, said first surface being in at least partial contact with said lower surface of said first active layer;
an intermediate layer comprising an upper surface, a lower surface, an inner edge, a planar portion and a wave portion extending radially outward from said inner edge to a raised feature on said engine liner, said wave portion comprising a plurality of continuous crests and troughs, wherein said crests contact said lower surface of said first spacer layer, wherein said planar portion extends radially outward from said wave portion;
a second spacer layer having an upper surface and a lower surface, wherein at least one of said troughs of said intermediate layer contact said upper surface of said second spacer layer and at least a portion of said lower surface is in contact with said engine liner, wherein said second spacer layer has a bead that receives said raised feature from said engine liner; and
wherein said first active layer bead and said intermediate layer plurality of crests and troughs are horizontally aligned with one another but horizontally offset from said bead in said second spacer layer.

2. The gasket of claim 1, wherein said full bead of said first active layer is radially displaced from an edge portion of said first active layer by a first active layer land.

3. The gasket of claim 1, wherein said second spacer layer comprises a bottom spacer layer land extending radially outwardly from an edge portion of said bottom spacer layer.

4. The gasket of claim 3, wherein said bottom spacer layer bead is radially outward from said bottom spacer layer land.

5. The gasket of claim 4, wherein said bottom spacer layer bead has a thickness less than a thickness of said bottom spacer layer.

6. The gasket of claim 1, wherein said first active layer, said first spacer layer and said intermediate layers each have substantially constant thicknesses.

7. The gasket of claim 1, wherein said first active layer and said intermediate layer are thinner than said first spacer layer.

8. The gasket of claim 5, wherein said bead in said bottom spacer layer is located radially outward from said wave portion.

9. The gasket of claim 1, wherein an upper portion of said bead in said second spacer layer contacts a lower surface of said intermediate layer.

10. The gasket of claim 1, wherein each of said layers are constructed of metal.

11. The gasket of claim 1, wherein said first active layer and said intermediate layer are constructed of hardened steel.

12. The gasket of claim 1, wherein said first spacer layer and said second spacer layer are constructed of steel.

13. The gasket of claim 1, wherein a third active layer is provided beneath said second spacer layer and above an engine block.

14. The gasket of claim 1, wherein said second spacer layer contacts said liner on either side of said raised feature of said engine liner.

15. The gasket of claim 1, wherein said wave portion is horizontally aligned with, but vertically offset from, at least a portion of said full bead in said first active layer.

16. The gasket of claim 1, wherein said troughs of said wave portion extend below said lower surface of said intermediate layer.

17. The gasket of claim 1, wherein said crests of said wave portion are planar with said upper surface of said intermediate layer.

* * * * *